United States Patent [19]
Ando et al.

[11] Patent Number: 5,659,838
[45] Date of Patent: Aug. 19, 1997

[54] METHOD AND SYSTEM FOR SUBSTANTIALLY ELIMINATING A SHADOW EFFECT DURING DUPLICATION

[75] Inventors: Kazuhiro Ando, Satsute; Tatsuo Tani, Urayasu, both of Japan

[73] Assignee: Ricoh Company, Ltd., Tokyo, Japan

[21] Appl. No.: 577,418

[22] Filed: Dec. 22, 1995

[30] Foreign Application Priority Data

Dec. 22, 1994 [JP] Japan .................................. 6-320800
Oct. 20, 1995 [JP] Japan .................................. 7-272544

[51] Int. Cl.⁶ .................................................. G03G 15/04
[52] U.S. Cl. ............................ 399/45; 355/75; 399/52; 399/377
[58] Field of Search ................. 355/208, 75, 311, 355/214, 218, 233, 320

[56] References Cited

U.S. PATENT DOCUMENTS

| | | | |
|---|---|---|---|
| 4,118,119 | 10/1978 | Maiorano | 355/218 |
| 4,975,735 | 12/1990 | Bright et al. | 355/75 |
| 5,422,737 | 6/1995 | Atoji et al. | 355/75 X |
| 5,521,692 | 5/1996 | Bares | 355/311 |

FOREIGN PATENT DOCUMENTS

| | | |
|---|---|---|
| 57-210370 | 12/1982 | Japan . |
| 59-33447 | 2/1984 | Japan . |
| 60-260942 | 12/1985 | Japan . |
| 61-79326 U | 5/1986 | Japan . |
| 63-269144 | 11/1988 | Japan . |
| 2-275936 | 11/1990 | Japan . |

*Primary Examiner*—Arthur T. Grimley
*Assistant Examiner*—Sophia S. Chen
*Attorney, Agent, or Firm*—Woodcock Washburn Kurtz Mackiewicz & Norris LLP

[57] ABSTRACT

The current invention discloses photocopying methods and systems for substantially eliminating shadows caused by uneven surfaces of an original by the use of a light diffusing element or a carrier sheet which automatically triggers the associated photocopying parameters. The light diffusing element has a marker or an identification code which is detected by a sensor placed along a paper path, and the marker contains various type of information used for adjusting the photocopying conditions associated with the use of the light diffusing element. The light diffusing element is also designed to be used with an automatic document feeder.

33 Claims, 12 Drawing Sheets

PLATEN GLASS

METHOD AND SYSTEM FOR SUBSTANTIALLY ELIMINATING A SHADOW EFFECT DURING DUPLICATION

FIELD OF THE INVENTION

The current invention is generally related to methods, articles of manufacture and systems for substantially eliminating an undesirable shadow in a duplicated image that is caused by an uneven surface of an original and in particular related to methods, articles of manufacture and systems for adjusting the duplicating parameters in duplicating devices such as photocopiers, fax machines and scanners in response to a detection of the light diffusing element which covers the uneven surface of the original.

BACKGROUND OF THE INVENTION

Figure 1:
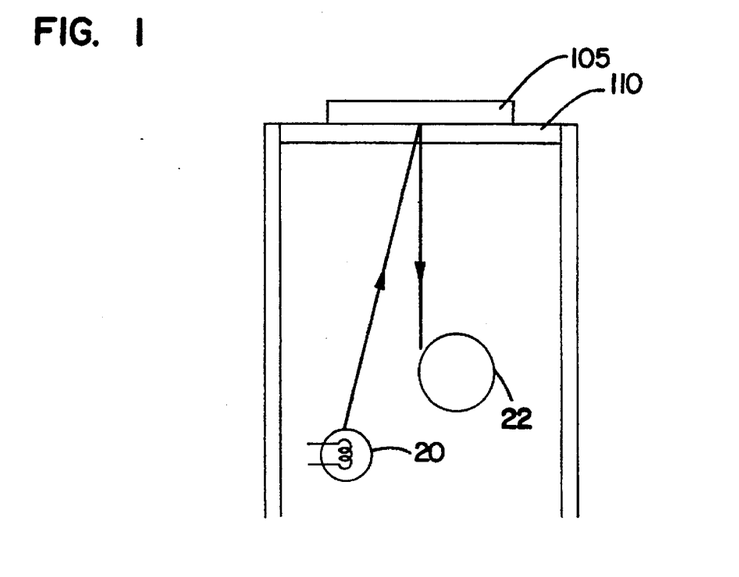
FIG. 1 diagrammatically illustrates how an image is formed from an original onto a photoreceptor by light emitted by a light source.

In the area of conventional xerography and photocopying, an image is generated according to reflected light from an original image. Referring to FIG. 1, a light source 20 emits light towards an original image 105 (hereinafter "an original") placed on a platen glass 110. The light transmits through the platen glass 110 and reaches the original 105, and the original reflects the light back towards the light source 20. The reflected light is then converted to a electronic signal so as to generate a corresponding image via toner placed on a photoreceptor 22. In a certain image conversion process, an electronic device such as a CCD is used before generating a photoreceptor image. In certain other image processing, the photoreceptor image is generated via the direct optical means such as mirrors and lenses. In either case, in order to accurately reflect the original image by reflecting the light emitted from the light source, the original must have a substantially smooth surface. However, the light reflecting surface of the original is not always smooth.

Figure 2:
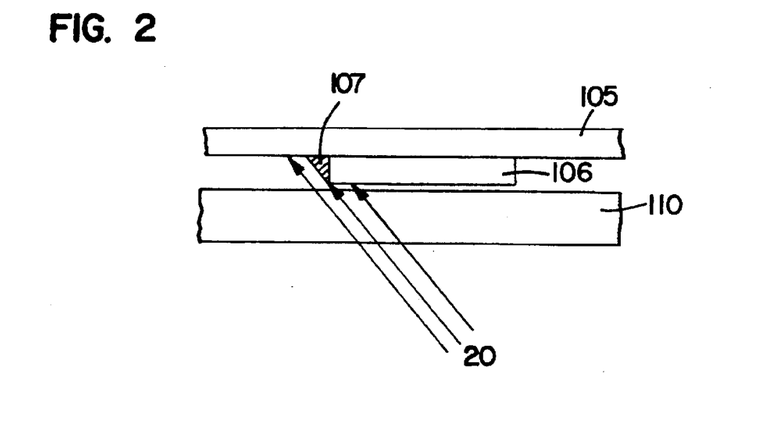
FIG. 2 diagrammatically illustrates how a shadow is caused by an uneven surface of an original when light is emitted from a light source situated below through a platen glass.

As shown in FIG. 2, an additional original 106 is placed on the surface of the original 105. For example, the additional original portion 106 may be a photograph pasted on an application. Because of the additional width of the attached portion 106, areas 107 adjacent to the edges of the attached portion 106 are shadowed. In other words, in this example, since the light emitted from the light source is not perfectly perpendicular to the edges of the attached portion 106, the edges of the attached portion prevents the light from reaching the areas 107 adjacent to the edges of the attached portion 106. Consequently, since the shadowed area 107 is duplicated as a dark area, a copy has undesirable dark edges around the attached portion 106. Similarly, even if no attachment is placed on the original, an uneven or wrinkled original causes a similar shadowing effect.

To prevent the above described undesirable shadow effect caused by the uneven surface of the original, prior attempts included various approaches. Earlier approaches included a plurality of flash lamps for emitting light in diffused directions. However, this approach required a larger housing to accommodate the plurality of these lamps. A second group of approaches included a light diffusing element which is placed between a platen glass and an original to solve the above described shadow problem.

Figure 3A:
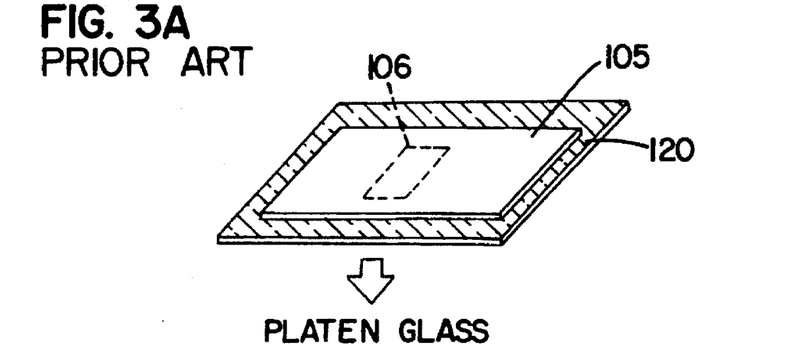
FIGS. 3A and 3B respectively illustrate a perspective view and a cross sectional view of a prior art attempt for solving the above shadow problem in FIG. 2 by a light diffusing element.
Figure 3B:
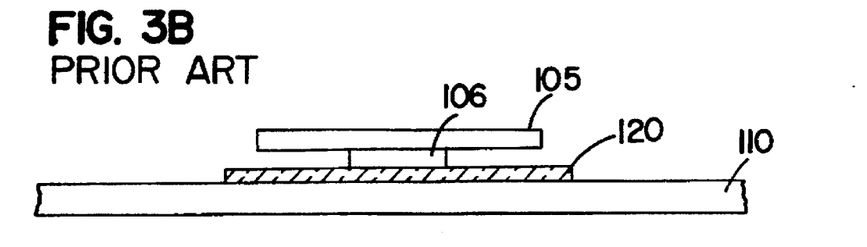

Referring to FIGS. 3A and 3B, the original 105 and the attached portion 106 are placed on the top of a light diffusing element 120 with the attached portion 106 directly contacting the light diffusing element 120. The above described assembly of the original 105, the added portion 106 and the light diffusing element 120 is placed on the platen glass 110 with the light diffusing element 120 contacting the platen glass 110. As shown in a cross sectional view in FIG. 3B, when a copy is made from the above described original, the light emitted from the copier light source 20 reaches the platen glass 110 and then the light diffusing element 120 before reaching the original 105 or the added portion 106.

Figure 4A:
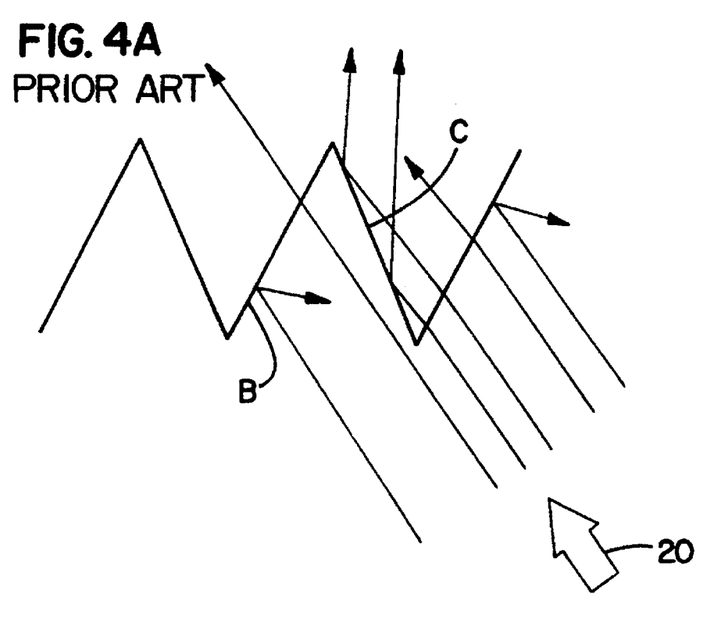
FIG. 4A diagrammatically illustrates a close up view of a light diffusing element as shown in FIGS. 3A and 3B.
Figure 4B:
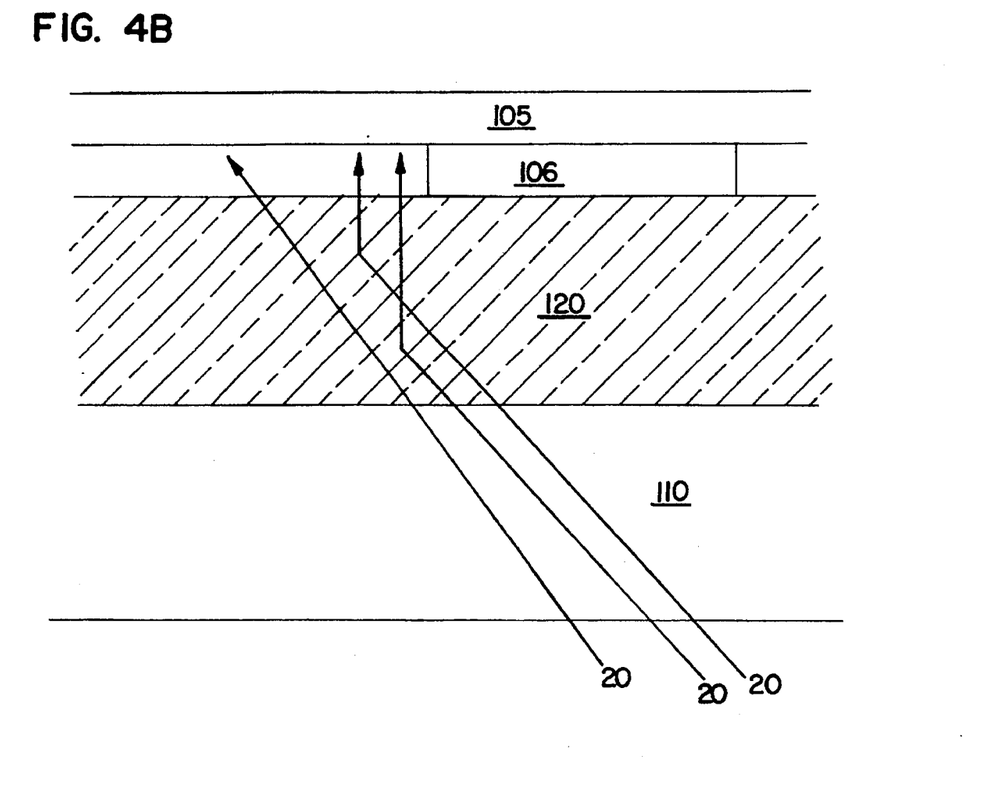
FIG. 4B illustrates how a shadow area is illuminated by the diffused light.

The light diffusing element 120 diffuses light as it transmits through the layers. Referring to FIG. 4A, a principle as to how the element 120 diffuses the emitted light is diagrammatically illustrated in a cross sectional view. Since the element 120 has certain refracting layers or a rough surface, certain light is reflected in an angle on an outer surface B while certain other light is reflected on an inner surface C at an angle. Yet, other light is refracted as it transits through the element 120. Consequently, the light reaching the original or added portion surfaces is diffused. As shown in FIG. 4B, the light diffused by the element 120 now reaches areas 107 around the edges of the added portion 106 to substantially eliminate the shadow areas.

Based upon the above described solution, Japanese Utility Model Application No. 61-79326 utilized a platen glass whose surface has fine peaks and valleys for diffusing light before reaching an original. Although the above platen glass reduced the shadow effect, the rough surface undesirably trapped dust and the dirty platen glass consequently deteriorated the copy image quality. The costs and the efforts associated with maintaining or replacing a dust-free platen glass were prohibitive.

In the alternative, Japanese Patent No. 60-260942 discloses a light diffusing sheet placed over a platen glass so that light is diffused before reaching a metal surface to be photocopied. Although light may be diffused for solving the above described shadow problem, the above Japanese patent discloses only a manual mode of the duplication process. In contrast to this disclosure, most photocopiers today are equipped with an automatic document feeder to facilitate the duplication of multiple pages. Some automatic document feeders are capable of duplicating two sides of an original. The use of the light diffusing sheet in an automatic document feeder. An automatic document feeder should be able to accommodate the additional thickness of the above described carrier sheet.

In addition, the above described light diffusing element placed on an original generally modifies the duplication process. For example, since a light source is calibrated to emit an appropriate amount of light to reach an original through a platen glass, the light source intensity must be adjusted to accommodate the light diffusion caused by the above described light diffusing element or a carrier sheet. The user should be able to use the light diffusing material without manually adjusting any processing characteristics. These and other features remain to be desired.

SUMMARY OF THE INVENTION

To solve the above described problems, a method of discriminating an original for substantially eliminating an undesirable shadow on a duplicated copy due to an uneven surface of the original, includes the steps of a) placing a light diffusing element over the uneven surface of the original; b) detecting the uneven surface on the original and generating a light diffusing mode signal; and c) based upon the light diffusing mode signal, selecting a predetermined duplication parameter, wherein a copy is duplicated from the original while substantially eliminating the undesirable shadow around the uneven surfaces.

According to a second aspect of the current invention, an article of manufacture for the use with an original with an uneven surface for a duplication device, the duplication device projecting a light onto the uneven surface, includes: a light diffusing element placed over the uneven surface of the original for diffusing the light over the uneven surface; and a marker element located on the light diffusing element for indicating that the original is covered with the light diffusing element.

According to a third aspect of the current invention, an article of manufacture for the use with an original having a first side and a second side, each side having an uneven surface for duplication, a duplication device projecting a light onto the uneven surface, includes a first light diffusing element placed over the first uneven surface of the first side for diffusing the light over the first uneven surface; a second light diffusing element placed over the second uneven surface of the second side for diffusing the light over the second uneven surface; and a binding portion integral to the first light diffusing element and the second light diffusing element for holding the original in between the first light diffusing element and the second light diffusing element, wherein the first uneven surface and the second uneven surface are duplicated while allowing the light to reach the first uneven surface and the second uneven surface.

According to a fourth aspect of the current invention, a system for duplicating a copy from an original with an uneven surface, including: a photocopying engine having a light source for emitting light towards the original so as to duplicate the copy based upon an image reflected by the original under the light; a light diffusing element placed over the original with an uneven surface for diffusing the light emitted from the light source before reaching the original; a sensor located near for detecting the light diffusing element and generating a light diffusing mode signal; and a controller connected to the sensor and the photocopying engine for adjusting the photocopying engine so as to substantially eliminate a shadow in the image generated by the uneven surface.

According to a fifth aspect of the current invention, an automatic document feeder for feeding an original placed in a light diffusing jacket, including: a housing including a document stacking area, a document exposing area, and a paper path of a first width connecting the document stacking area to the document exposing area; a sensor placed in the paper path for detecting the light diffusing jacket; and an adjuster operationally connected to the sensor for adjusting the first width to a second width in the paper path.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 5:
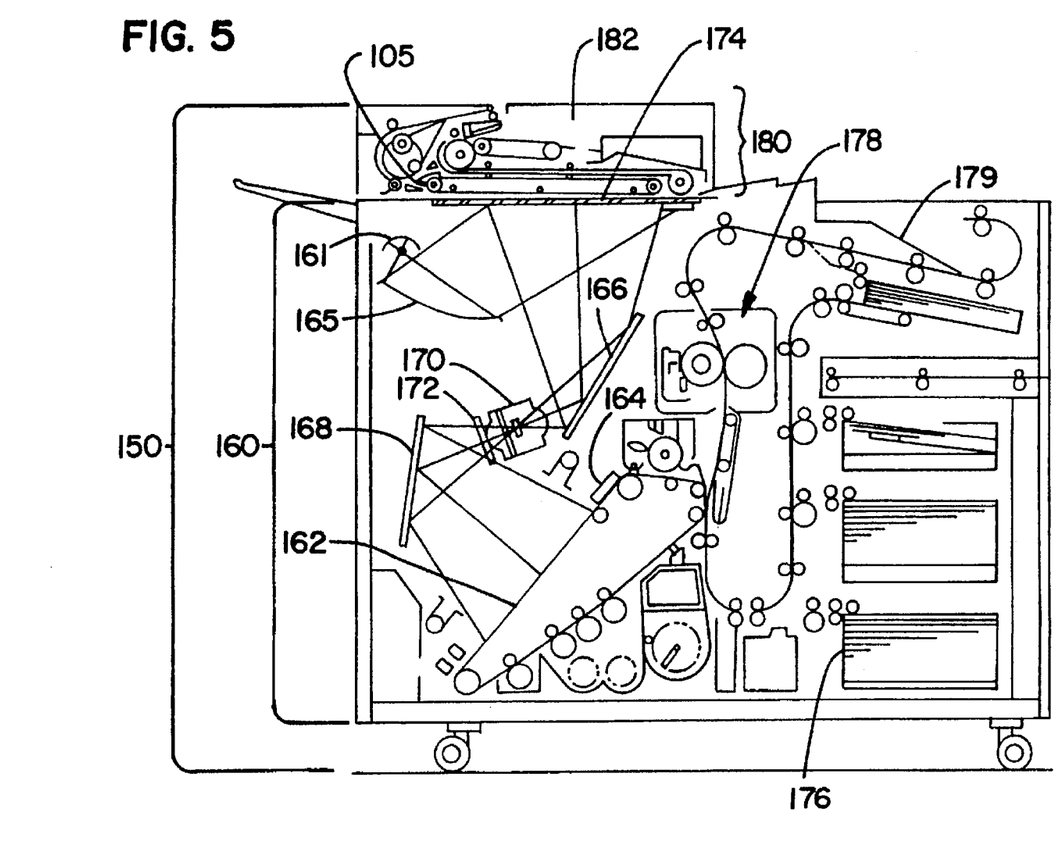
FIG. 5 diagrammatically illustrates certain components of a photocopier that are generally relevant to practice the current invention.

Referring now to the drawings, wherein like reference numerals designate corresponding structure throughout the views, and referring to FIG. 5, a photocopier with an automatic document feeder is illustrated to provide a general background description for practicing the current invention. The current invention, nonetheless, is not limited to practicing with photocopiers, and other image duplicating devices such as scanners, fax machines and the like are also included within the spirit of the current invention. With respect to parts of a conventional photocopier 150 relevant to the current invention, a photocopying engine housing 160 houses components for duplicating a copy while an automatic document feeder housing 180 is located over the photocopying engine housing 160 and houses components for feeding an original for duplication. According to this example, in an automatic documentation feed (ADF) mode, originals are placed in an input tray 182 and are transported towards a platen glass 174 which is located on the top of the photocopying engine housing 160. In contrast, in a manual feed mode, the ADF housing 180 is lifted above the platen glass 174 in a predetermined position, and a copy operator manually places an original 105 with its face down on the platen glass. In either feeding mode, only one original is placed on the platen glass at any given time for duplication.

Still referring to FIG. 5, also according to this example, in the photocopying engine housing 160. A light source 161 emits light towards a reflector 165, and the reflected light is aimed at the platen glass 174 at a predetermined angle in an upward direction. The platen glass 174 substantially transmits the reflected light without refraction, the transmitted light reaches an original 105 placed over the other side of the platen glass 174. Some reflected light from the original 105 subsequently reaches a first mirror 166, a lens 170, a filter 172, a second mirror 168 and then a photoreceptor belt 162. Prior to the arrival of the reflected light, a corona charger 164 applies a uniform layer of electrical charges to the photoreceptor belt 162. Since the reflected light removes certain charges according to an image to be duplicated, the subsequent toner application results in a desired toner image on the photoreceptor belt 164. Finally, the desired toner image is transferred to an image-carrying medium supplied by a medium supplying unit 176 and is fixed by an image fixation unit 178. Finally, the copy is delivered to an output tray 179.

Figure 6A:
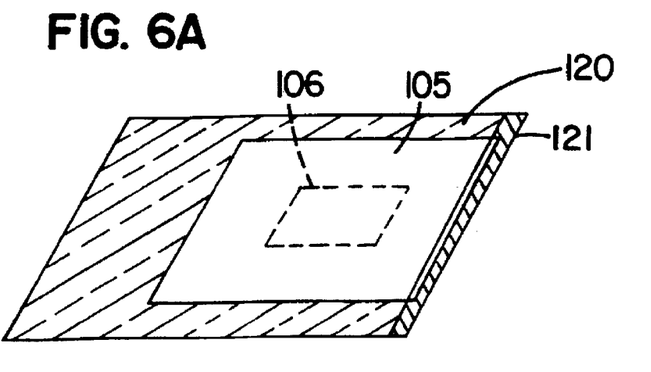
FIGS. 6A and 6B respectively illustrate a perspective view and a cross-sectional view of a light diffusing element with an end holer.

Referring to FIG. 6A, in order to duplicate an original 105 with an overlapping portion 106, one preferred embodiment of a light diffusing element 120 is provided with an adhesive edge portion 121. The sheet 120 diffuses light over the original surface so as to substantially eliminate shadow areas on the uneven original 105, 106. However, when an operator places the light diffusing sheet 120 on the platen glass and the original 105, 106 over the light diffusing sheet 120, the position of the original with respect to the platen glass is not precisely maintained during the manual feeding procedure. To help stabilize the original 105, 106, the light diffusing sheet 120 includes an adhesive edge 121 which holds the original 105, 106 at a fixed position with respect to the light diffusing sheet. Now referring to FIG. 6B, a cross sectional view illustrates the above described light diffusing sheet 120 and the adhesive edge portion 121 with respect to the originals 105, 106. The adhesive edge is slightly raised so that the thickness of the added portion 106 is accommodated. The adhesive portion 121 has an adhesive capability only sufficient to provide temporal holding of the original 105, and it does not damage the secured surface of the original 105. In fact, the adhesive is reusable for many times.

Figure 6B:
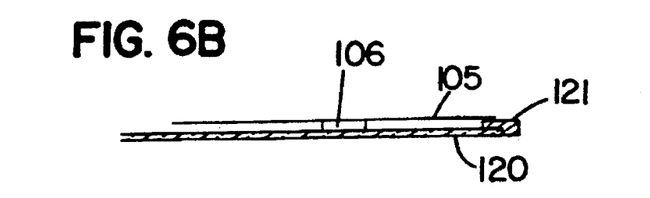

Still referring to FIGS. 6A and 6B, the light diffusing sheet 120 and the adhesive portion 121 are both sufficiently thin and flexible for the use with an automatic document feeder (ADF). In the ADF mode, one original secured to the above described light-diffusing element is fed to an ADF, or multiple originals each secured to the light diffusing sheet are placed in the ADF input tray. In either case, each assembly of the original, 105, 106 and the light diffusing sheet 120 must be placed in the ADF input tray in such a way that when it is transported to the platen glass, the light diffusing sheet 120 directly contacts the platen glass for diffusing light emitted from the photocopying engine before reaching the originals 105 and 106.

To diffuse light, the light diffusing element 120 has at least one light diffusing surface which consists of minute peaks and valleys as shown in FIG. 4A. According to one preferred embodiment of the current invention, the above described surface is treated with chemical solutions such as organic or alkaline solutions or mechanical means by stretching with a fine embossing roller. The treated surface is placed near or on the surface that is in contact with the originals 105, 106. In addition, to make the light diffusing element sufficiently thin and flexible, the element 120 is made from various types of materials including vinyl chloride, polyester and so.

Figure 7A:
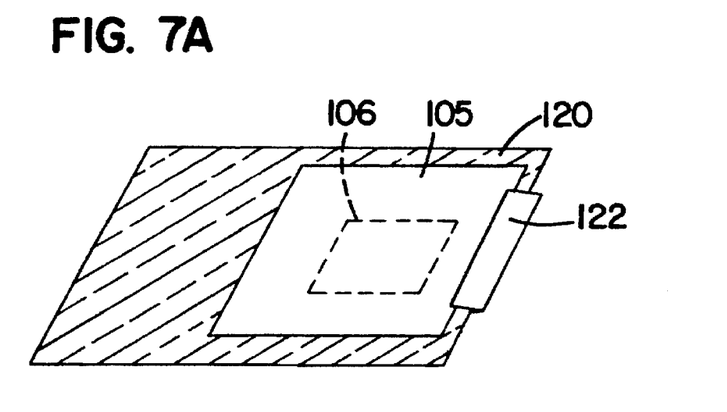
FIGS. 7A and 7B respectively illustrate a perspective view and a cross-sectional view of a light diffusing element with an end clipper.
Figure 7B:
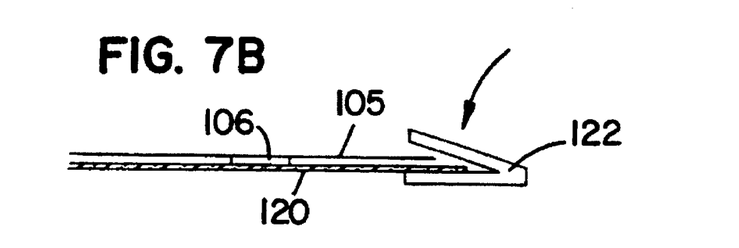

Now referring to FIGS. 7A and 7B, a second preferred embodiment of the light diffusing sheet according to the current invention includes a carrier sheet 120 and a clipper end 122. One end of the original 105 is clipped to hold the light diffusing sheet 120 by a clipper 122. Although the clipper 122 secures the light diffusing sheet 120 to the original 105 more securely, the clipper generally tends to be undesirably thick for the use in an ADF. However, the use the clipper 122 with an ADF is possible if the thickness of the clipper 122 is sufficiently thin or the ADF is capable of adjusting its paper path.

The above described holding means and light diffusing sheet are generally designed for duplicating a one-sided original in a manual mode as well as in an automatic document feeder mode. In a manual feed mode, as described above, the light diffusing sheet is placed directly upon a platen glass. In an automatic feed mode, if automatic document feeders are designed to have a relatively straight paper path rather than a curved path, the straight paper path does not generally tend to move the position of the originals with respect to the light diffusing sheet. Thus, the above described light diffusing devices as shown in FIGS. 6 and 7 are also suitable for one-sided duplication in the above described ADF.

Figure 8:
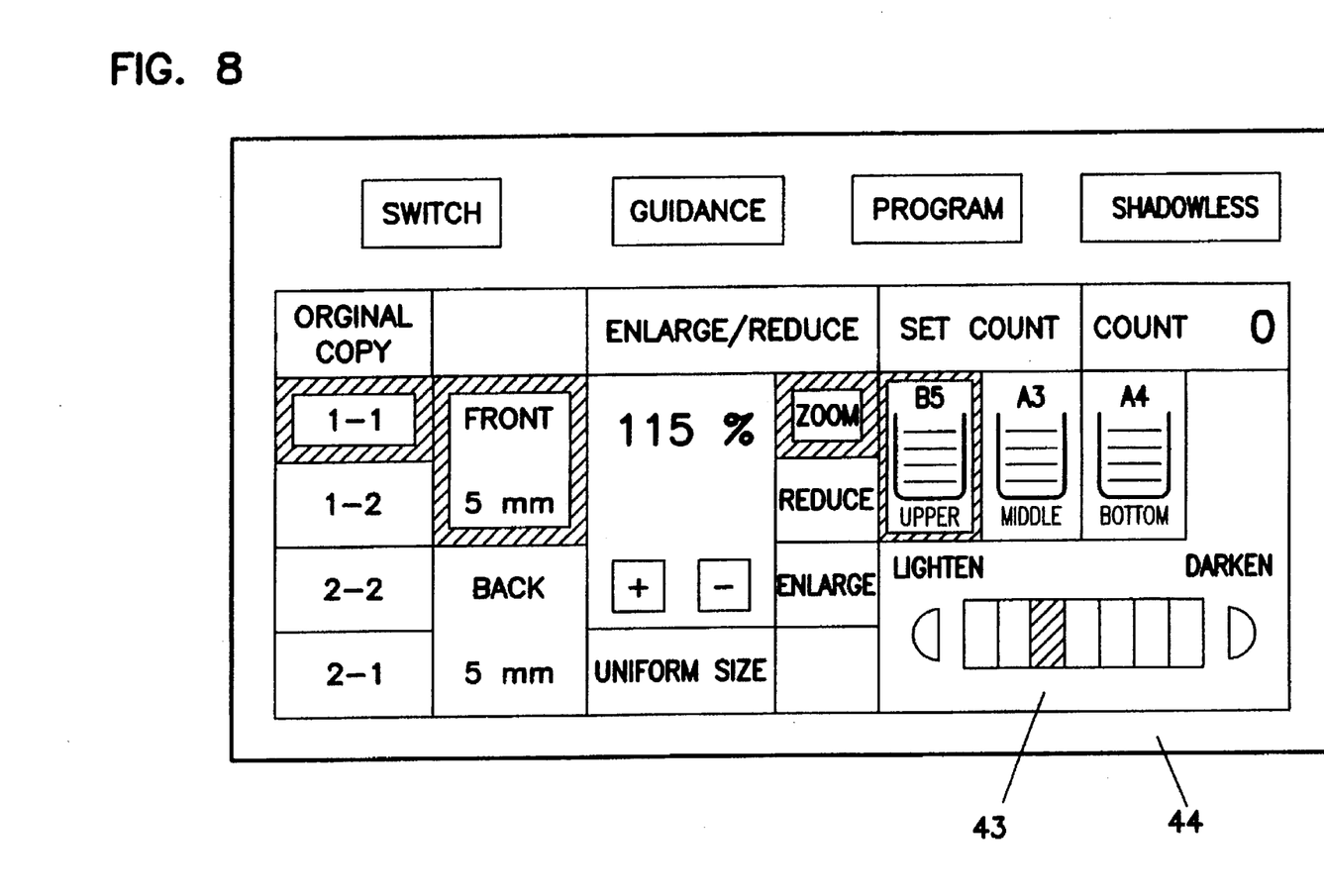
FIG. 8 illustrates an input/display panel for a photocopying system according to the current invention.

When the above light diffusing element is used, in order to obtain a normal copy, a higher light intensity level is required. When the light is diffused by the light diffusing element, the amount of light reaching the original is smaller than when the light directly reaches the original without diffusion. Because of this condition, the higher light intensity level must be manually specified when the light diffusing element needs to be specified so that an optimal amount of light reaches the original. To control the amount of light, a user has to specify the above light condition via an input/display panel 44 of a typical photocopier as illustrated in FIG. 8. A "SHADOWLESS" button indicates that the light source is adjusted to a predetermined intensity level for the use of the light diffusing element. The predetermined light intensity level will be further described in reference to FIG. 13. In the alternative, a "LIGHTEN-DARKEN" contrast adjustment 43 may be used to modify the amount of light on a trial basis.

Figure 9:
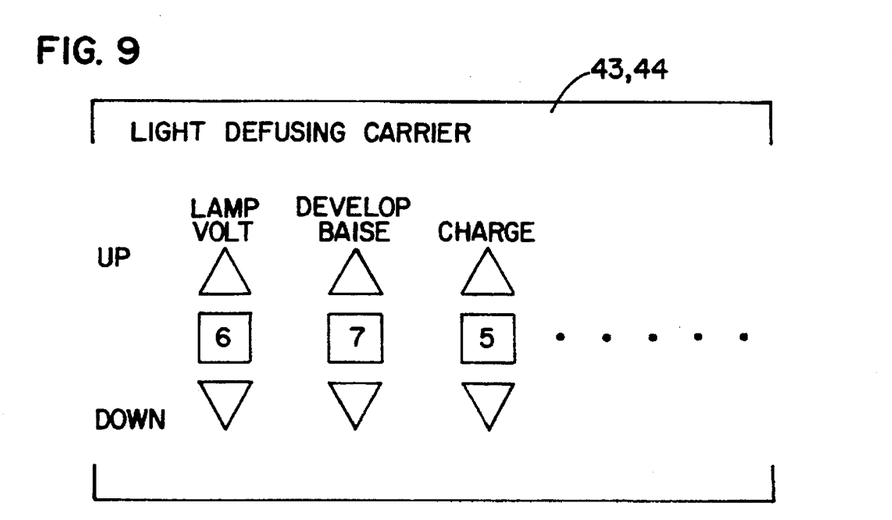
FIG. 9 illustrates another input/display panel for additional parameters to be manually controlled.

Referring to FIG. 9, an alternative embodiment of the above described "LIGHTEN-DARKEN" control as shown in FIG. 8 is illustrated according to the current invention. In this embodiment, the contrast control is accomplished by adjusting the voltage applied to the light source, the bias voltage applied to a developer unit and/or the voltage applied to a corona charger. Any one or combination of these parameters adjusts the image contrast. As an operator changes each of these parameters by pressing an upward or downward switch as indicated by triangles, an adjusted value is indicated in a corresponding display. In another alternative embodiment, these adjustment controls are displayed in a touch-sensitive screen when the "SHADOWLESS" switch is activated.

Figure 10A:
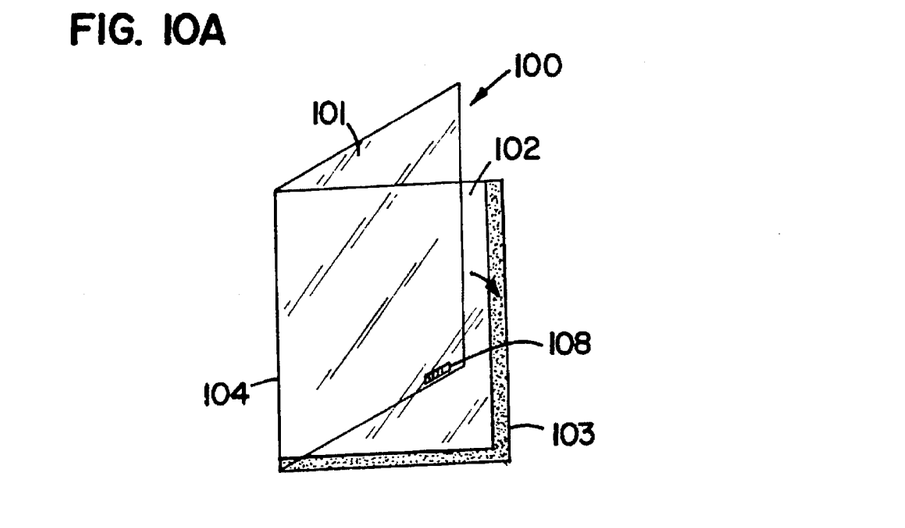
FIGS. 10A and 10B respectively illustrate a perspective view and a cross sectional view of one preferred embodiment of a light diffusing element or a carrier sheet with an identification marker according to the current invention.
Figure 10B:
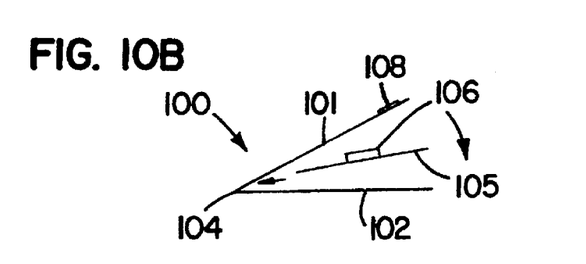

Now referring to FIGS. 10A and 10B, a third preferred embodiment, the light diffusing element 100 according to the current invention is illustrated. A first light diffusing sheet 101 and a second light diffusing sheet 102 are bound by a binding portion 104 so that a double-sided original 105 is inserted between the first and second light diffusing sheets 101 and 102 as shown in FIG. 10B. As described above, each of the light diffusing sheets 101 and 102 have at least one light diffusing layer near or on the surface which contacts the original. In addition, a portion of the second light diffusing sheet 102 has an adhesive portion 103 for securing the first light diffusing sheet as well as the original 105, 106. Referring to FIG. 10B, although the original 105 has an overlapping portion 106 only on one side, another overlapping portion may be placed on the other side of the original 105. In addition, in lieu of the double-sided original, a single-sided original may be used with the above described light diffusing element 100.

Still referring to FIGS. 10A and 10B, the third preferred embodiment, the light diffusing element 100 according to the current invention further includes a marker 108 for indicating certain information on the above described light diffusing assembly 100. The marker 108 is usually located outside of an image area to be duplicated. Although FIG. 10B indicates that the marker 108 has an additional thickness, it may be implemented as a bar code printed on the surface of the light diffusing sheet. However, the marker 108 is not limited to such implementation and includes any type of information-containing device that can be read later by a sensor. In fact, in an alternative embodiment the bar code may also be printed on the original and is read by a sensor but is not duplicated on the image-carrying medium. The information includes some or all of the following: whether the original is double-sided or single-sided, whether an overlapping portion is placed on both sides of the original or not, a type of material for the light diffusing sheet and or a light intensity level to which a source light is adjusted, the size of the original and so on. The above information is read before the light diffusing sheet is positioned on a platen glass as will be later described.

Figure 11:
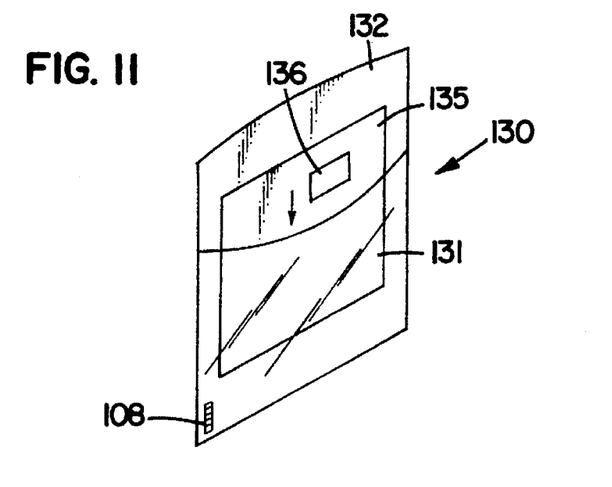
FIG. 11 illustrates a perspective view of a second preferred embodiment of an envelop-style light diffusing element with an identification marker according to current invention.

Referring to FIG. 11, a fourth preferred embodiment according to the current invention is illustrated in a light diffusing element 130. While light diffusing sheet 131 is substantially identical to the above described light diffusing sheet, it is affixed to a background sheet 132 in such manner as to provide a pouch in which a one-sided original 135 and an over lapping portion 136 are tacked. The light diffusing sheet 131 presses the original against the background sheet 132 to maintain a fixed position with respect to the light diffusing sheet 131. The background sheet 132 is generally not light transmitting and substantially flexible. The background sheet 132 is capable of providing a structural support for the light diffusing sheet if so desired. The light diffusing sheet 131 also includes the above described marker for similar data except for information related to double-sidedness. In the alternative, the background sheet 132 is replaced with a structurally firm light diffusing element for holding a double-sided original in the pouch in the described manner.

Figure 12:
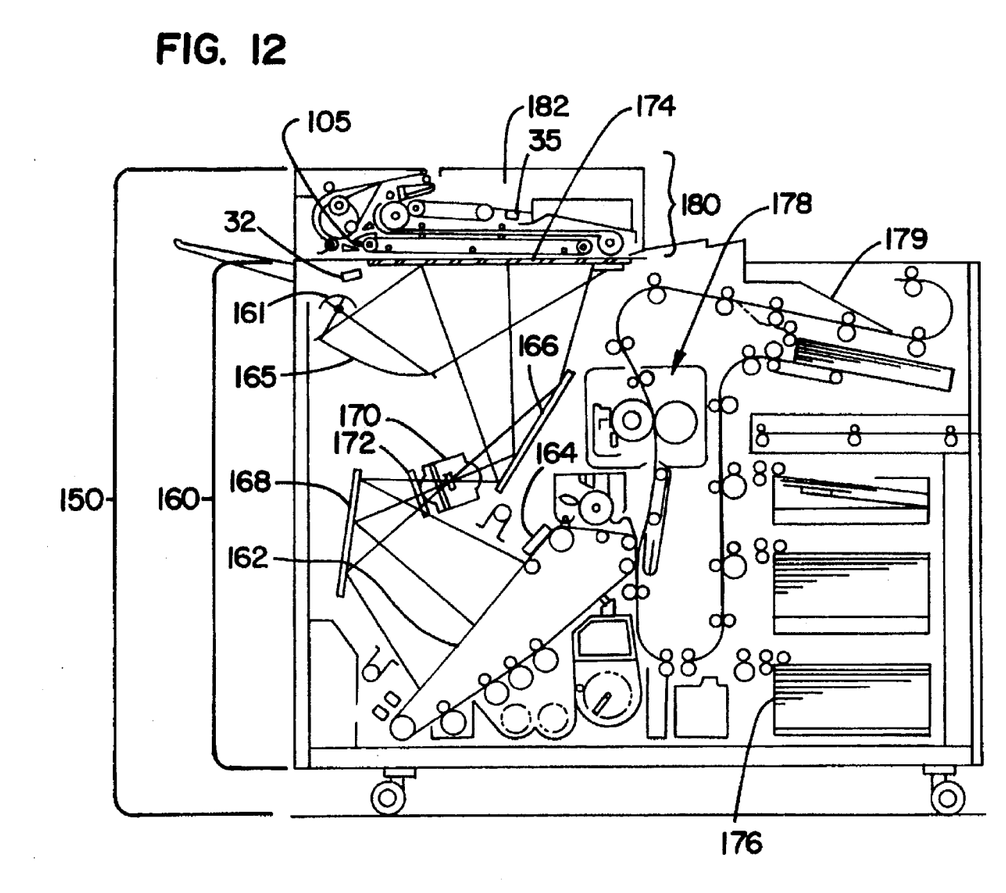
FIG. 12 diagrammatically illustrates certain components of a photocopier that are generally relevant to practice the current invention along with sensors to detect the light diffusing element according to the current invention.

The above described preferred embodiments for the light diffusing sheet as illustrated in FIGS. 10A, 10B and 11 are also designed to be used with an ADF. Referring to FIG. 12, originals placed in the light diffusing sheets of the above described preferred embodiments (the sheet-original assembly) are individually or collectively placed in an input tray 182 of an ADF 180. For a one-sided original, each of the sheet-original assemblies must be placed in the tray 182 in such a manner that an intended side to be duplicated is transported to face a platen glass 174. For a double sided original, the sheet-original assembly may be placed either face down or up. A sensor 35 is located underneath the tray 182 to detect the presence of the light diffusing sheet in a first embodiment of an ADF. In a second embodiment of the ADF, the sensor 35 reads the above described information contained in the marker 108. The retrieved information is sent to other parts of the photocopying engine 160 so as to adjust the photocopying conditions that are suitable for a given sheet-original assembly. For example, based upon the retrieved information, an intensity of the light source 161 is adjusted. In addition to the sensor 35, a second substantially similar sensor 32 is located near the platen glass 174 when the sheet-original assembly is manually placed on the platen glass.

Figure 13:
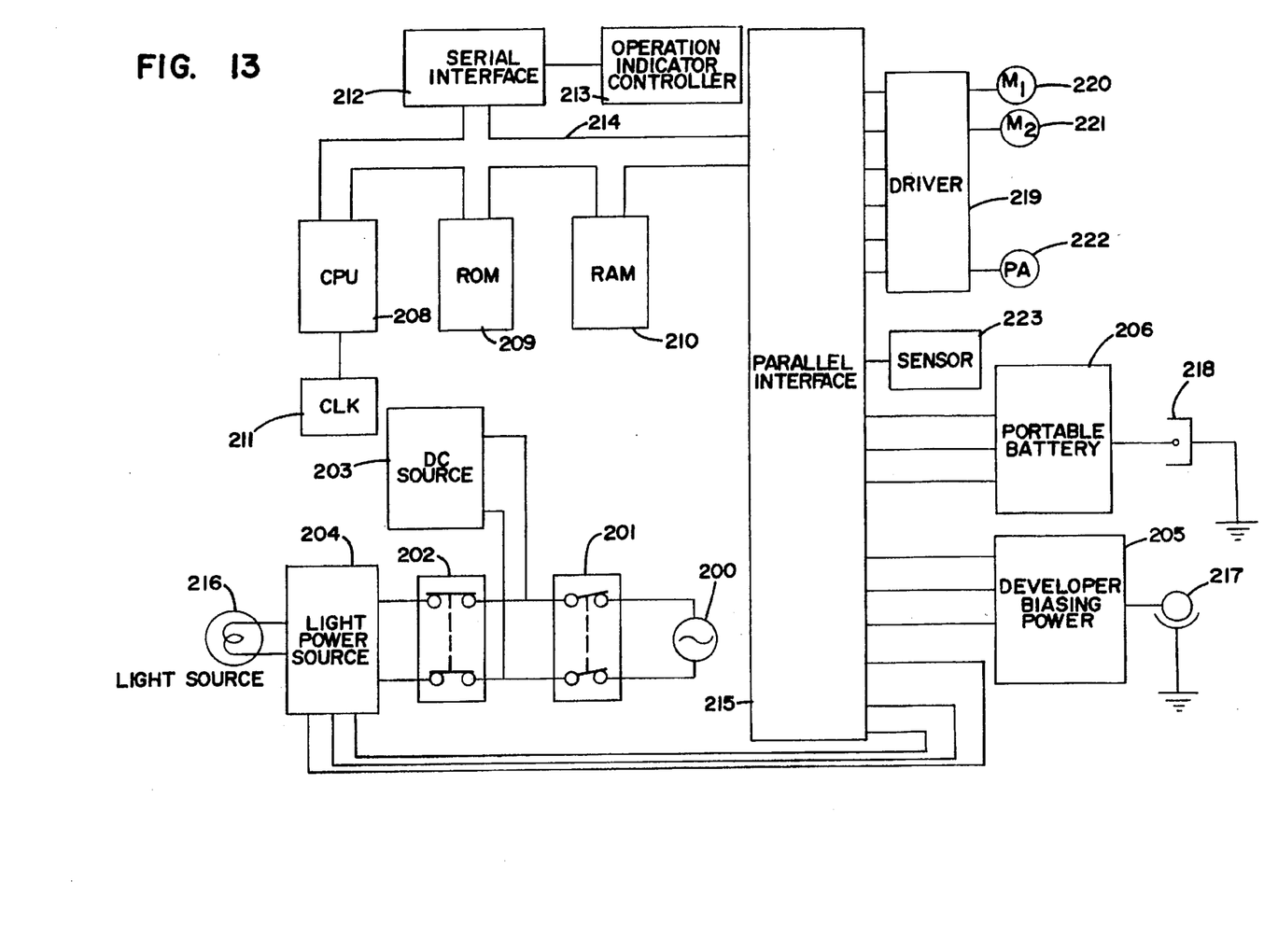
FIG. 13 is a block diagram of components associated with a sensor and a controller for adjusting duplication parameters.

Referring to FIG. 13, after a sensor 32, 35 reads the above described information, a controller performs the following tasks. The parallel interface 215 sends a signal to a CPU 208 which is clocked by a clock 211. The CPU 208 runs a control program that is retrieved into a RAM 210 from a ROM 209. A serial interface 212 interfaces these processing components as well as an operation indicator controller unit 213 for the operator inputted information, and these processing components are connected via bus line 214. A driver 219 in general controls mechanical units via the parallel interface 215. When the sensor 32, 35 generates certain information signals such as a light diffusing element signal for a particular material such as polyester, the control program retrieves the corresponding adjustment parameters from ROM 209. For example, these parameters specify a certain voltage to be applied to a light power source 204 for optimizing the light intensity of a light source 20 for the use of the polyester light diffusing element. Another parameter may adjust a developer biasing power unit 205 for adjusting a developer 217 in a photocopying engine. In the alternative, the user inputted information is read into RAM 210 from the operation indicator controller 213 via the serial interface so that the control program adjusts the photocopying conditions. This invention is not limited to the above components and includes the adjustments of other components.

Figure 14:
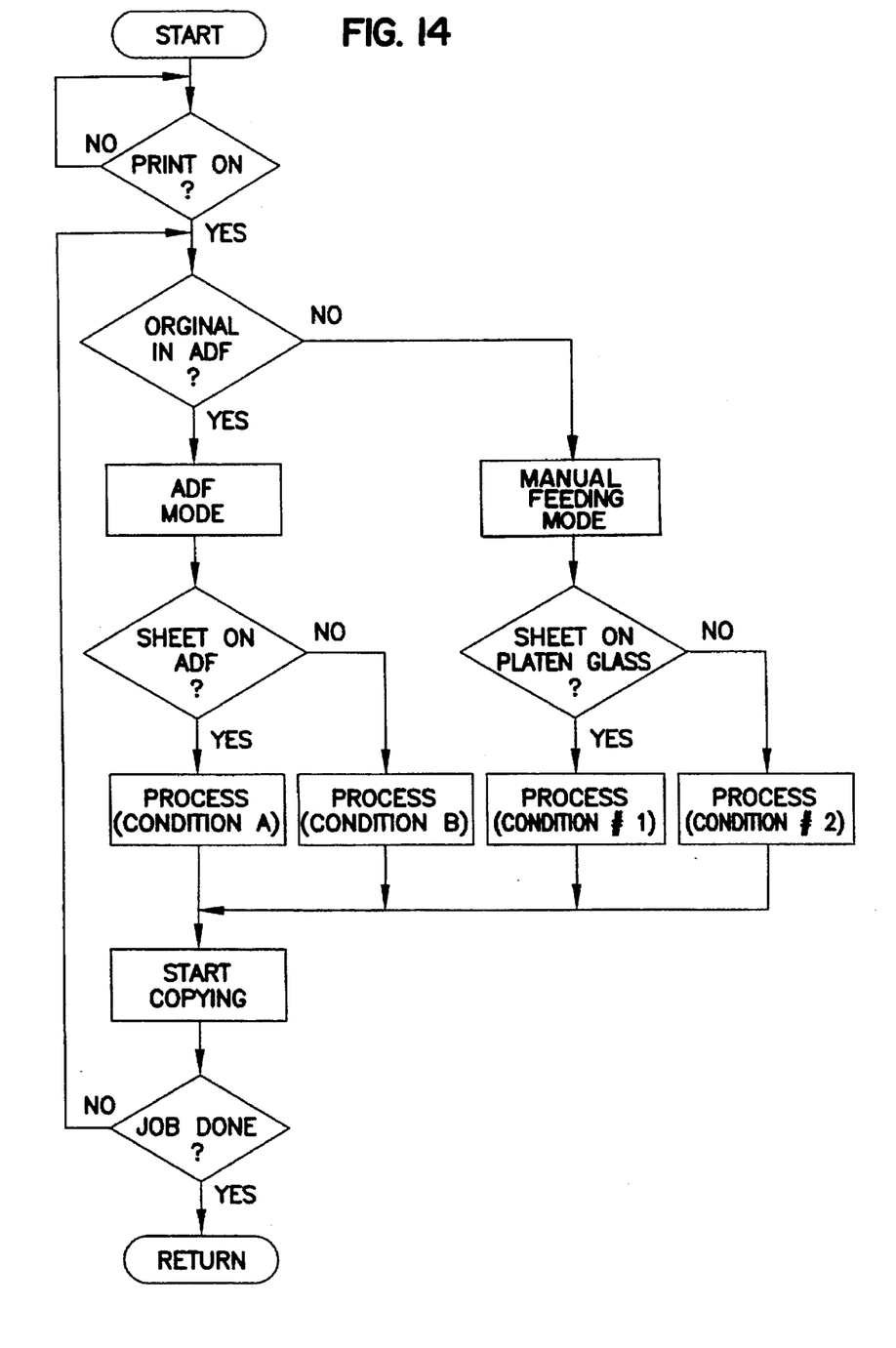
FIG. 14 is a flow chart for illustrating how a process condition is selected based upon a detection of a light diffusing element or a carrier sheet.

Referring to FIG. 14, a process flow of the above described system is illustrated in a flow chart. After a user activates a photocopy switch, a "Print On" step proceeds to determine whether an ADF is being used in an "Original In ADF" step. If the process in an ADF mode, it is further determined whether the original is in a light diffusing sheet. A "Process Condition A" is selected with the use of the light diffusing sheet in the ADF mode, while a "Process Condition B" is selected without the use of the light diffusing sheet in the ADF mode. In a manual feeding mode (that is, an ADF is not used), a "Process Condition #1" is selected with the use of the light diffusing sheet, while a "Process Condition #2" is selected without the use of the light diffusing sheet. After a photocopying environment is adjusted to an appropriate condition, copying starts in the "Start Copying" step. When the specified photocopying job is completed, this task is completed.

Figure 15:
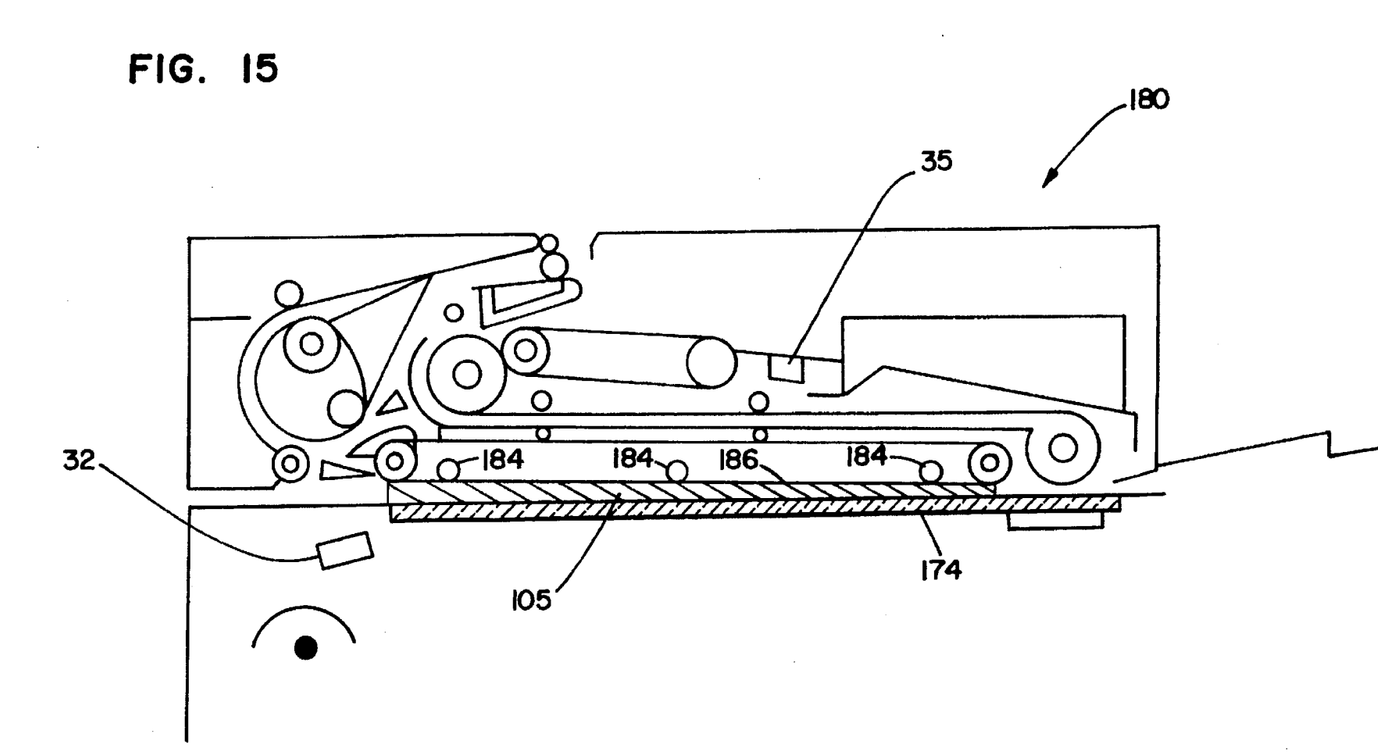
FIG. 15 is a close-up cross sectional view of an automatic document feeder unit.

Referring to FIG. 15, a close-up cross sectional view of one preferred embodiment of the ADF 180 according to the current invention is shown in relation to a platen glass 174 and a light diffusing sheet-original assembly 105 placed in a paper path. Certain ADF's are not designed to accommodate the thickness of a sheet-original assembly. To allow the sheet-original assembly 105 to move in a paper path between the platen glass 174, transfer belt rollers 184, and a transfer belt 186, the width of the paper path must be accordingly adjusted by an adjuster 190 as indicated by dotted lines.

Figure 16A:
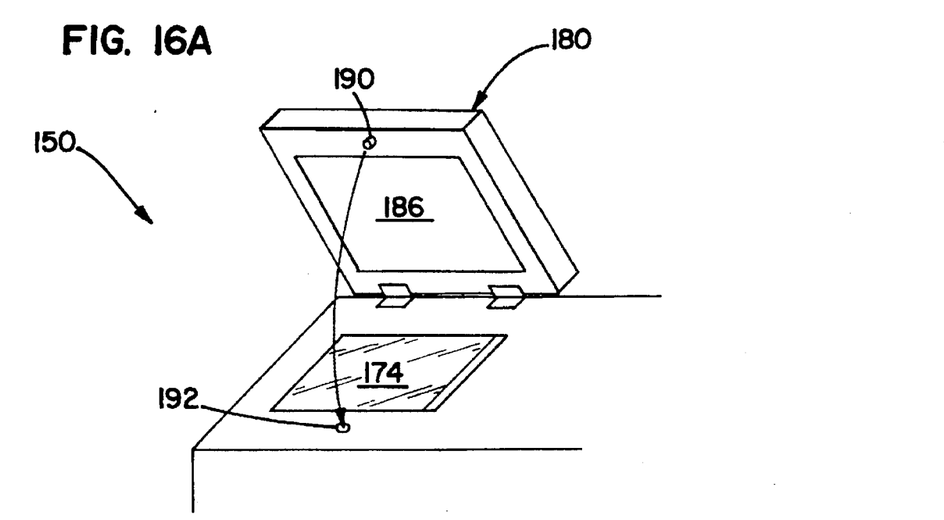
FIG. 16A illustrates a perspective view of a preferred embodiment of an automatic document feeder at a lifted position for manual copying operation according to the current invention.
Figure 16B:
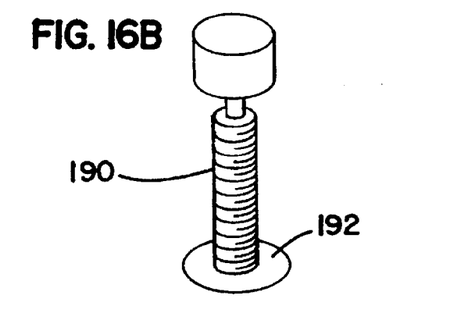
FIG. 16B illustrates a close-up perspective view of one preferred embodiment of an adjuster according to the current invention.
Figure 16C:
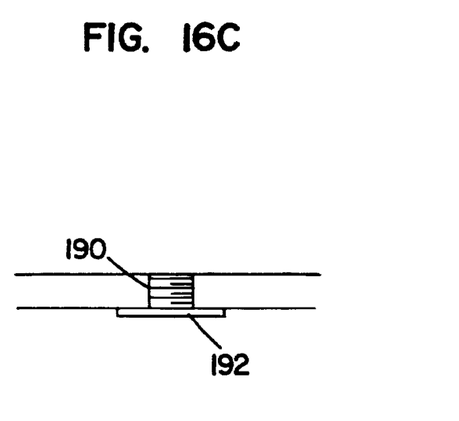
FIG. 16C illustrates an adjuster at a first predetermined position for a normal copying mode.
Figure 16D:
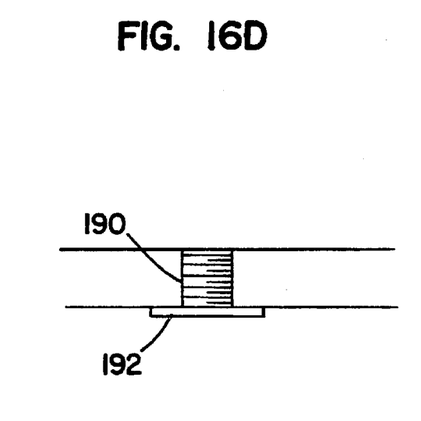
FIG. 16D illustrates an adjuster at a second predetermined position for a carrier sheet copying mode.

To adjust the width of the paper path for the substantially thick sheet-original assembly, FIG. 16A illustrates an adjuster 190 is placed at the bottom of the document feeder 180. The adjuster 190 opposes a corresponding receptacle located on the top portion of a photocopying housing near the platen glass 174. FIG. 16B illustrates a close-up perspective view of the adjuster 190. A minute driving device 194 is connected to a height adjustment portion 198 via a shaft 196. As the driver 194 rotates, the height adjustment portion 198 moves vertically with respect to the receptacle 192 to modify its vertical position. As shown in FIG. 16C, when a sheet-original assembly is sufficiently thin or when only an original is used without a light diffusing sheet, the height of the adjuster 190 is set to a predetermined low position. On the other hand, when a sheet-original has a substantially thick width, the height of the adjuster 190 is adjusted to a predetermined high position so that the ADF is lifted away from the platen glass 174 to provide sufficient clearance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of discriminating an original having an uneven surface for substantially eliminating an undesirable shadow on a duplicated copy due to the uneven surface, comprising the steps of:
   a) placing a light diffusing element over the uneven surface of the original;
   b) detecting the light diffusing element placed near the original and generating a light diffusing mode signal; and
   c) based upon the light diffusing mode signal, selecting a predetermined duplication parameter, wherein a copy is duplicated from the original while substantially eliminating the undesirable shadow around the uneven surfaces.

2. The method of discriminating an original according to claim 1 wherein said step b) is accomplished by detecting a certain predetermined characteristics of the light diffusing element.

3. The method of discriminating an original according to claim 2 wherein said certain predetermined characteristics include a predetermined bar code placed on the light diffusing element.

4. The method of discriminating an original according to claim 1 wherein said certain predetermined duplication parameter includes an intensity value of a photocopying light source.

5. The method of discriminating an original according to claim 4 wherein said intensity value is predetermined and stored.

6. The method of discriminating an original according to claim 1 wherein said steps b) and c) are repeated by automatically feeding the original, said repeated steps being defined as an automatic feeding process.

7. The method of discriminating an original according to claim 6 wherein the light diffusing mode signal causes said automatic feeding process to be adjusted for processing the original with the light diffusing element.

8. The method of discriminating an original according to claim 7 wherein the light diffusing mode signal causes said automatic feeding process to be adjusted for duplicating both sides of the original.

9. The method of discriminating an original according to claim 1 wherein said step a) further comprises an additional step of stabilizing the original with respect to the light diffusing element.

10. An article of manufacture for the use with an original having an uneven surface for a duplication device, the duplication device projecting a light onto the uneven surface, comprising:
    a light diffusing element placed over the uneven surface of the original for diffusing the light over the uneven surface; and
    a marker element located on the light diffusing element for indicating that the original is covered with the light diffusing element.

11. The article of manufacture for the use with an original having an uneven surface according to claim 10 wherein said marker includes a bar code.

12. The article of manufacture for the use with an original having an uneven surface according to claim 10 wherein said light diffusing element includes polyester.

13. The article of manufacture for the use with an original having with an uneven surface according to claim 10 wherein said light diffusing element includes vinyl chloride.

14. The article of manufacture for the use with an original having an uneven surface according to claim 10 wherein the original being double-sided, said light diffusing element consists of two sheets, the original being placed between said two sheets.

15. The article of manufacture for the use with an original having an uneven surface according to claim 14 wherein one of said two sheets being transparent to the light.

16. The article of manufacture for the use with an original having an uneven surface according to claim 10 further comprising a stabilizer for fixing the position of the original with respect to the light diffusing element.

17. The article of manufacture for the use with an original having an uneven surface according to claim 10 wherein a light diffusing element further comprises an integral adhesive portion for adhering the original at a fixed position with respect to said light diffusing element.

18. The article of manufacture for the use with an original having an uneven surface according to claim 10 wherein a light diffusing element has a thickness of approximately less than 2 millimeters and being flexible.

19. An article of manufacture for the use with an original having a first side and a second side, each side having an uneven surface for duplication, a duplication device projecting a light onto the uneven surface, comprising:
    a first light diffusing element placed over the first uneven surface of the first side for diffusing the light over the first uneven surface;
    a second light diffusing element placed over the second uneven surface of the second side for diffusing the light over the second uneven surface; and
    a binding portion integral to said first light diffusing element and said second light diffusing element for holding the original in between said first light diffusing element and said second light diffusing element, wherein said first uneven surface and said second uneven surface are duplicated while allowing the light to reach the first uneven surface and the second uneven surface.

20. The article of manufacture according to claim 19 further comprising a marker for indicating that the original is between said first light diffusing element and said second light diffusing element.

21. The article of manufacture according to claim 20 further comprising a marker for indicating that the original is one-sided.

22. The article of manufacture according to claim 20 further comprising a marker for indicating that the original is double-sided.

23. The article of manufacture according to claim 19 further comprising a stabilizing portion for holding the original at a fixed position with respect to said biding portion.

24. A system for duplicating a copy from an original having an uneven surface, comprising:

a photocopying engine having a light source for emitting light towards the original so as to duplicate the copy based upon an image reflected by the original under the light;

a light diffusing element placed over the original with an uneven surface for diffusing the light emitted from the light source before reaching the original;

a sensor near for detecting the light diffusing element and generating a light diffusing mode signal; and a controller connected to said sensor and said photocopying engine for adjusting said photocopying engine in response to said light diffusing mode signal so as to substantially eliminate a shadow in the image generated by the uneven surface.

25. The system for duplicating according to claim 24 wherein said controller controls an intensity of said light source.

26. The system for duplicating according to claim 24 wherein said photocopying engine further comprises a photoreceptor drum upon toner is placed according to said image, said controller controlling an amount of the toner on said photoreceptor drum.

27. The system for duplicating according to claim 24 wherein said light diffusing element further comprises a marker to be detected by said sensor.

28. The system for duplicating according to claim 27 wherein said marker includes a bar code and said sensor includes a optical reader.

29. The system for duplicating according to claim 24 further comprising:

an automatic document feeder located near said photocopying engine for automatically feeding the original, said automatic document feeder having a paper path for the original; and a paper path adjuster operationally connected to said controller for adjusting said paper path in response to said light diffusing mode signal.

30. The system for duplicating according to claim 29 wherein said sensor is located near the paper path.

31. The system for duplicating according to claim 24 further comprising a memory connected to said controller for storing parameters for adjusting said photocopying engine.

32. The system for duplicating according to claim 31 further comprising an input panel connected to said controller for manually selecting said parameters.

33. An automatic document feeder for feeding an original placed in a light diffusing jacket, comprising:

a transportation unit for transporting the original in the light diffusing jacket, the transportation unit including a document stacking area, a document exposing area, and a paper path of a first width connecting the document stacking area to the document exposing area;

a sensor placed near the document stacking area for detecting the light diffusing jacket; and an adjuster operationally connected to said sensor for adjusting the first width to a second width in the paper path so as to allow easy passage of the original in the light diffusing jacket.

* * * * *